(12) United States Patent
Shea

(10) Patent No.: US 6,830,275 B2
(45) Date of Patent: Dec. 14, 2004

(54) SPEAKER MOUNTED IN RECREATIONAL VEHICLE

(76) Inventor: Brian J. Shea, 12640 Dragoon Trail, Mishawaka, IN (US) 46544

( * ) Notice: Subject to any disclaimer, the term of this patent is extended or adjusted under 35 U.S.C. 154(b) by 0 days.

(21) Appl. No.: 10/366,856

(22) Filed: Feb. 14, 2003

(65) Prior Publication Data

US 2004/0100123 A1 May 27, 2004

Related U.S. Application Data

(60) Provisional application No. 60/429,664, filed on Nov. 27, 2002.

(51) Int. Cl.$^7$ .............................................. B60R 21/00
(52) U.S. Cl. ......................... 296/1.07; 381/86; 381/182
(58) Field of Search ................................ 296/1.07, 156, 296/164, 168; 381/86, 182, FOR 165; 181/140, 141, 144

(56) References Cited

U.S. PATENT DOCUMENTS

| | | | |
|---|---|---|---|
| 1,866,831 A | * 7/1932 | Wolff et al. ................. 181/147 |
| 4,032,725 A | * 6/1977 | McGee ....................... 381/395 |
| 4,056,165 A | * 11/1977 | Okamoto et al. .......... 181/141 |
| 4,101,159 A | * 7/1978 | Stewart ..................... 296/37.7 |
| 4,439,643 A | * 3/1984 | Schweizer ................. 381/395 |
| 4,453,047 A | 6/1984 | Thompson |
| 4,593,784 A | * 6/1986 | Flanders .................... 181/144 |
| 4,594,729 A | * 6/1986 | Weingartner ................ 381/18 |
| 4,597,470 A | * 7/1986 | Takagi et al. ............... 181/141 |
| 4,612,530 A | * 9/1986 | Kurth et al. ................ 340/429 |
| 4,778,134 A | 10/1988 | Struthers et al. |
| 5,034,996 A | * 7/1991 | Carey et al. ................ 455/345 |
| 5,073,944 A | * 12/1991 | Hirasa ......................... 381/86 |
| 5,088,574 A | * 2/1992 | Kertesz, III ................ 181/150 |
| 5,201,896 A | 4/1993 | Kruszewski |
| 5,228,090 A | * 7/1993 | Marler ......................... 381/86 |
| 5,299,766 A | 4/1994 | Curtis et al. |
| 5,310,149 A | 5/1994 | Struthers et al. |
| 5,414,229 A | 5/1995 | Rocheleau et al. |
| 5,423,500 A | 6/1995 | Struthers et al. |
| 5,730,409 A | 3/1998 | Baron et al. |
| D394,660 S | 5/1998 | Hrach, Jr. et al. |
| 5,822,023 A | * 10/1998 | Suman et al. .............. 348/837 |
| 5,979,590 A | * 11/1999 | Telmos ....................... 181/141 |
| 6,209,939 B1 | * 4/2001 | Wacker ..................... 296/24.3 |
| D451,495 S | 12/2001 | McGurty |
| D471,433 S | 3/2003 | Vogels |
| 6,529,610 B1 | 3/2003 | Ogawa et al. |
| 6,721,431 B1 | * 4/2004 | Johnson ..................... 381/336 |
| 2003/0053644 A1 | * 3/2003 | Vandersteen ............... 381/182 |
| 2003/0091206 A1 | * 5/2003 | Proni ......................... 381/182 |
| 2004/0042627 A1 | * 3/2004 | Ryan et al. ................. 381/182 |

* cited by examiner

Primary Examiner—D. Glenn Dayoan
Assistant Examiner—H. Gutman
(74) Attorney, Agent, or Firm—Barnes & Thornburg LLP

(57) ABSTRACT

An apparatus comprises a speaker for use with a recreational vehicle. The speaker is supported relative to the ceiling so as to extend through an aperture in the ceiling. The speaker has a central axis that is oblique relative to a lower surface of the ceiling.

22 Claims, 7 Drawing Sheets

SPEAKER MOUNTED IN RECREATIONAL VEHICLE

This application claims priority under 35 U.S.C. §119(e) to U.S. Provisional Application Ser. No. 60/429,664, filed Nov. 27, 2002, which is expressly incorporated by reference herein.

BACKGROUND

The present disclosure relates to speakers, and particularly to mounting speakers in recreational vehicles.

Recreational vehicles may include video systems including televisions and speakers for the televisions. Due to the limited amount of space that may be available in recreational vehicles, there is an ongoing need to configure and arrange items and amenities in recreational vehicles so as to reduce the amount of space taken up by such items and amenities. Some conventional speaker systems used in recreational vehicles include brackets that project into the occupant space of the vehicle and that have speakers, such as cube style speakers, mounted to the brackets. Occupants may sometimes bump their heads on these types of speakers or brackets. In addition, these types of speakers and brackets may obstruct the vision of vehicle occupants. Furthermore, vehicle motion and vibrations may cause the speakers to shift relative to the brackets into unwanted positions.

SUMMARY

In accordance with the present invention, an apparatus comprises a speaker mounted in a vehicle and has one or more of the following features or combinations thereof. The vehicle may be a recreational vehicle. The speaker may be supported relative to a ceiling of the recreational vehicle so that a first portion of the speaker is above a lower surface of the ceiling and a second portion of the speaker is below the lower surface of the ceiling. The speaker may have a central axis that is oblique relative to the lower surface to direct sound in a desired direction. A mounting bracket for the speaker may be coupled to the ceiling. A wall of the mounting bracket may be inclined relative to the lower surface. The wall of the mounting bracket may extend through an aperture in the ceiling. The speaker may be coupled to the wall so that its central axis is oblique relative to the lower surface. A cover may be used to cover the mounting bracket and a portion of the speaker.

In an illustrative embodiment, the speaker is part of a surround sound system which comprises, for example, five speakers and a television. In the illustrative system, there is a mounting bracket for each speaker to mount the speakers to the ceiling. Three of the speakers face rearwardly in the recreational vehicle and two of the speakers face forwardly in the recreational vehicle.

Additional features and advantages of the present disclosure will become apparent to those skilled in the art upon consideration of the following detailed description exemplifying the best mode as presently perceived.

BRIEF DESCRIPTION OF THE DRAWINGS

The detailed description particularly refers to the accompanying figures in which.

DETAILED DESCRIPTION OF THE DRAWINGS

Figure 1:
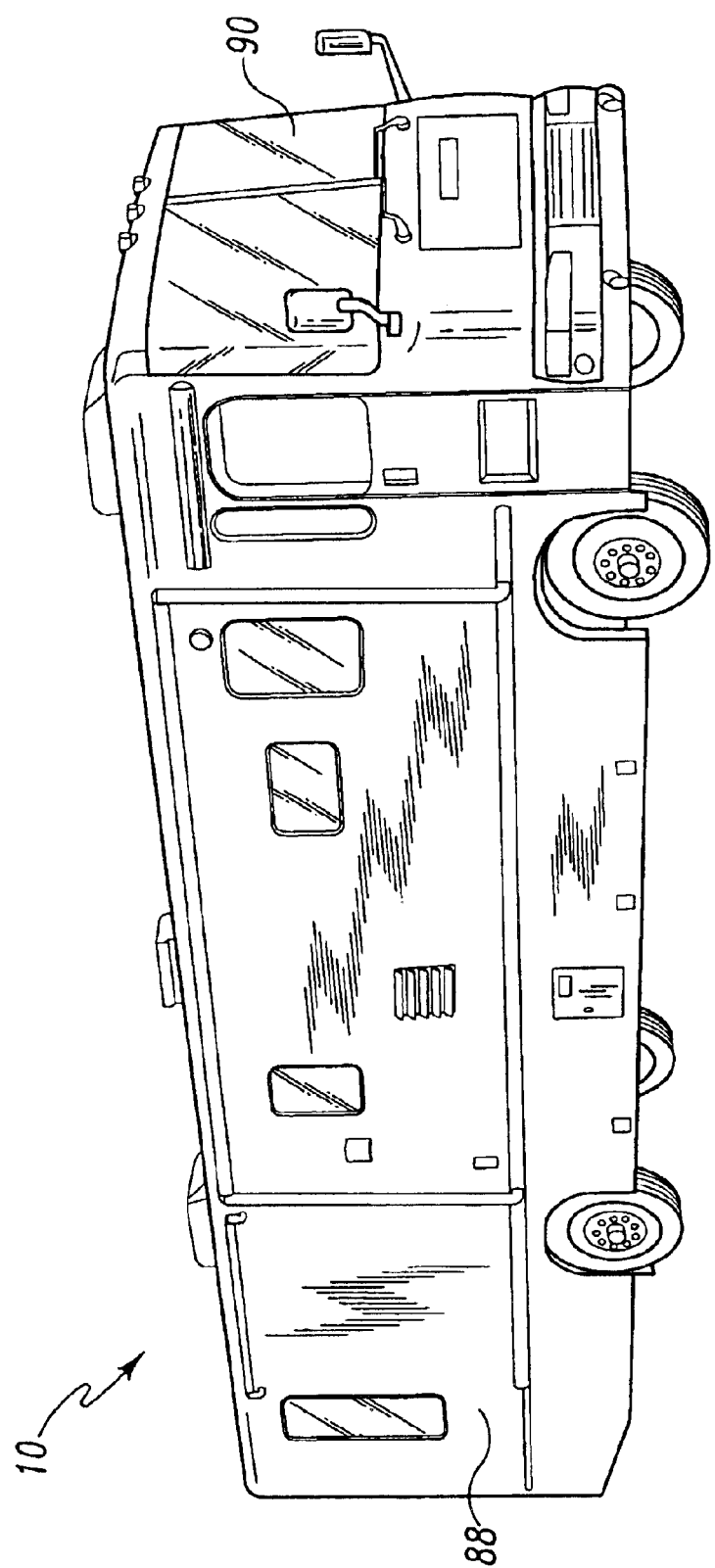
FIG. 1 is a perspective view of a recreational vehicle.
Figure 2:
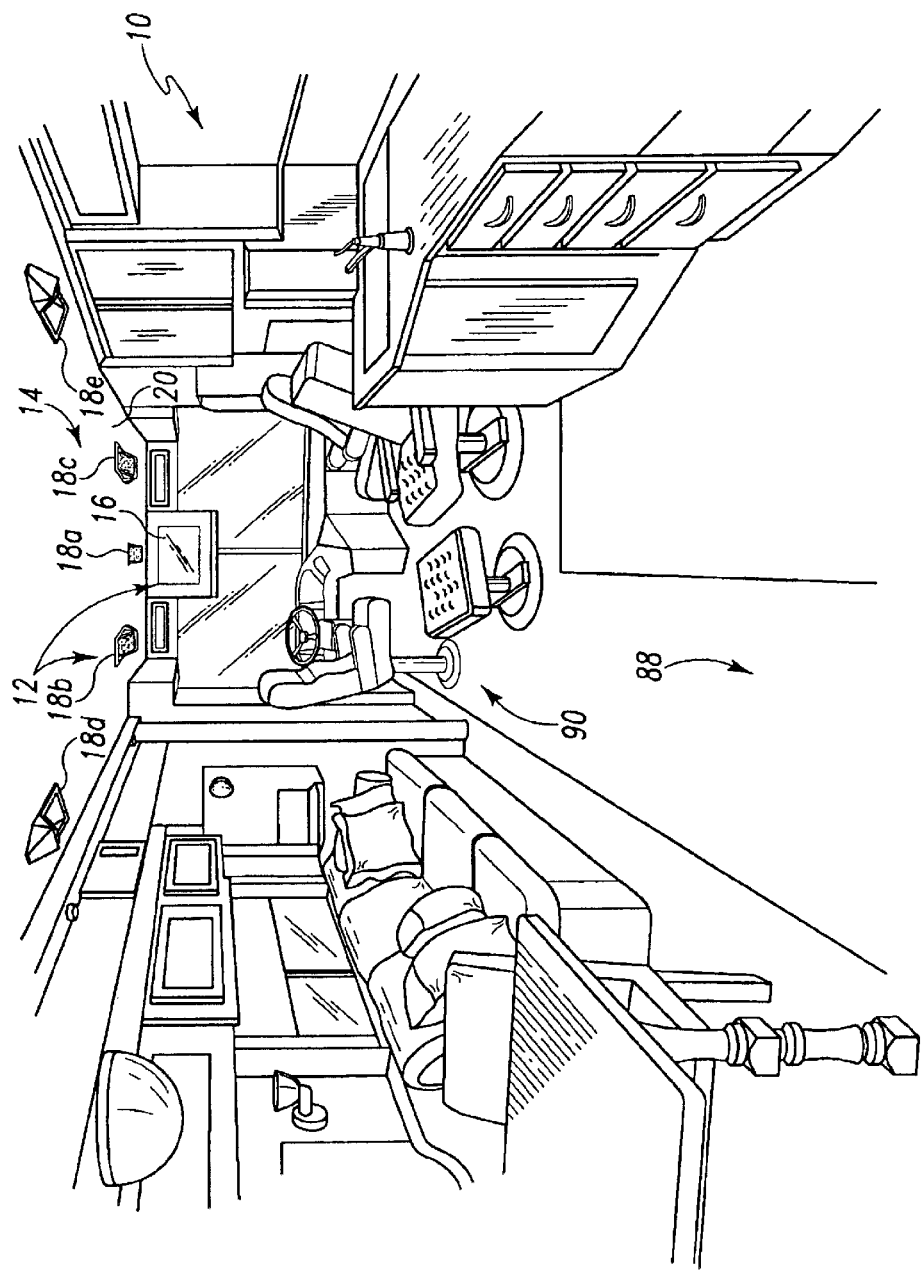
FIG. 2 is a perspective view of the interior of the recreational vehicle of FIG. 1 showing five speaker systems mounted to the ceiling of the vehicle to provide a surround sound system for use with a video system such as a television.

An apparatus comprises a recreational vehicle 10 shown in FIGS. 1 and 2 and an entertainment package 12 shown mounted in the recreational vehicle 10 in FIG. 2. The entertainment package 12 comprises, for example, a surround sound system 14 operatively associated with a video system such as a television 16 to provide sound associated with images displayed on the television 16.

The surround sound system 14 comprises, for example, five speaker systems (each of which may be referred to herein by its specific reference character 18a, 18b, 18c, 18d, or 18e or by the general reference character 18), as shown in FIG. 2. The center front speaker 18a is coupled to a first channel of the surround sound system 14. The left front speaker 18b is coupled to a second channel of the surround sound system 14. The right front speaker 18c is coupled to a third channel of the surround sound system 14. The left and right rear speakers 18d, 18e are coupled to a fourth channel of the surround sound system 14. The speaker systems 18a, 18b, 18c, 18d, 18e are mounted to a ceiling 20 of the recreational vehicle 10 so as to extend at least partially into and out of the ceiling 16 in a generally "out-of-the-way" manner and to direct sound in a desired direction as discussed in more detail herein. It should be understood that the apparatus may comprise any number of the speaker systems 18 and those speaker systems 18 may not be part of a surround sound system.

Figure 3:
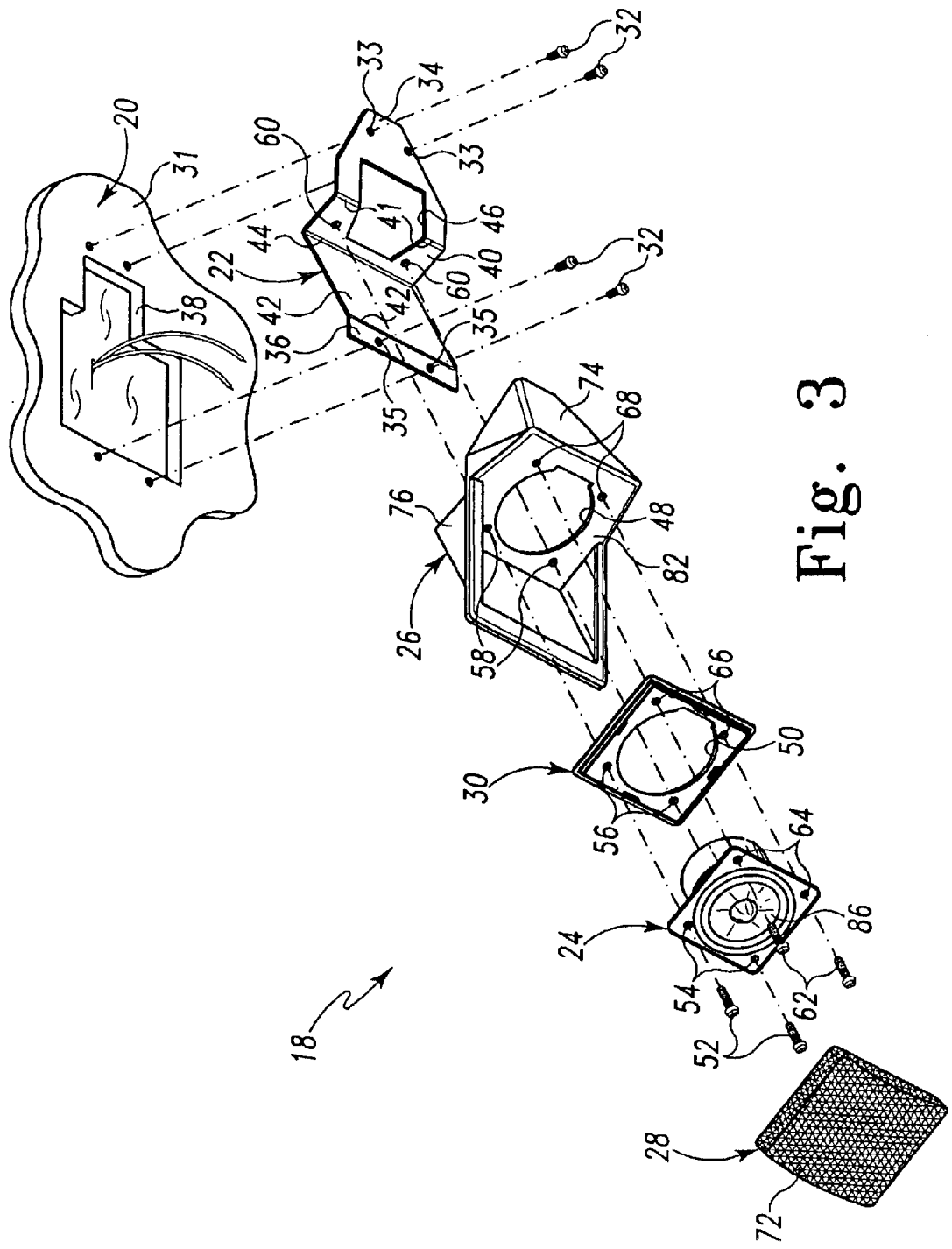
FIG. 3 is an exploded perspective view of one of the speaker systems of FIG. 2.
Figure 6:
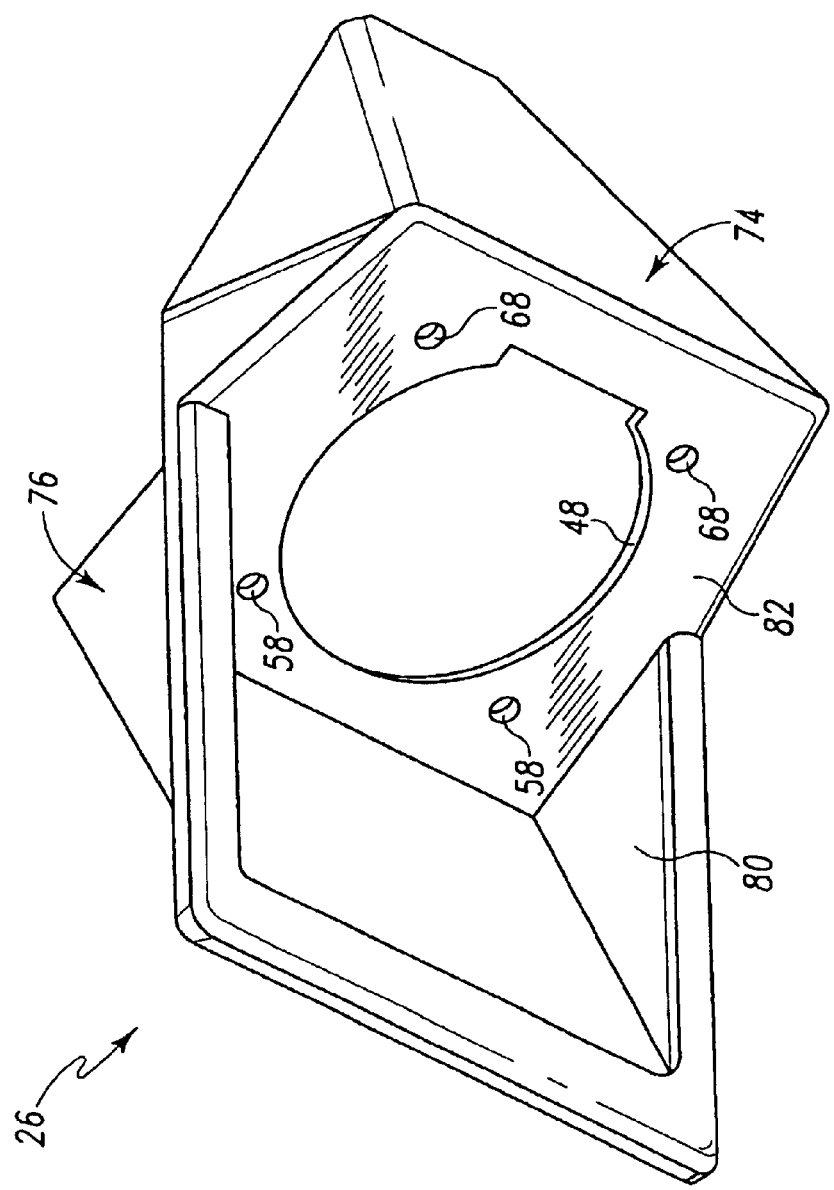
FIG. 6 is a perspective view of a cover of the speaker system of FIG. 3.

Each speaker system 18 comprises a mounting bracket 22 to be coupled to the ceiling 16 and a sound generating speaker 24 to be coupled to the mounting bracket 22, as shown in FIG. 3. A cover 26 shown also in FIG. 6 is configured to be coupled to the mounting bracket to cover the mounting bracket 22 and at least a portion of the speaker 24. A protective member 28 is configured to be coupled to a support 30 captured between the speaker 24 and the cover 26 to protect components of the speaker 24.

Figure 4:
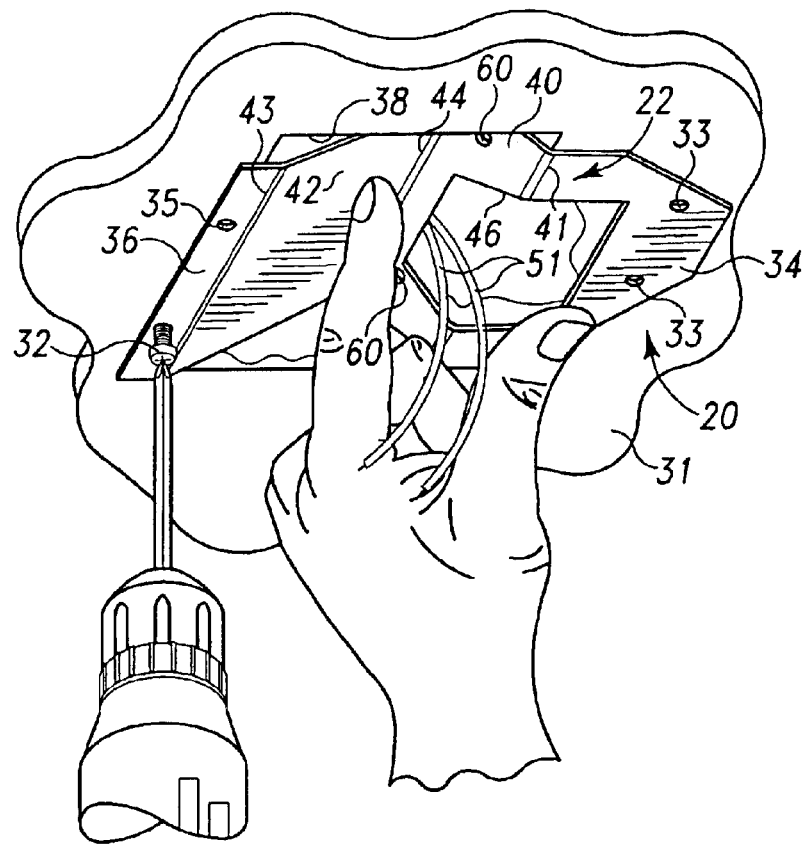
FIG. 4 is a perspective view showing a mounting bracket of the speaker system of FIG. 3 being coupled to the ceiling of the recreational vehicle.
Figure 5:
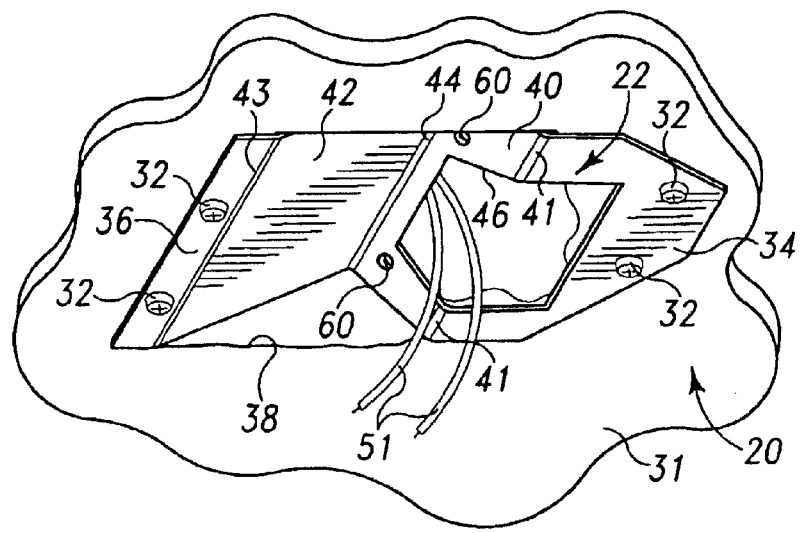
FIG. 5 is a perspective view showing the mounting bracket of FIG. 4 coupled to the ceiling.
Figure 7:
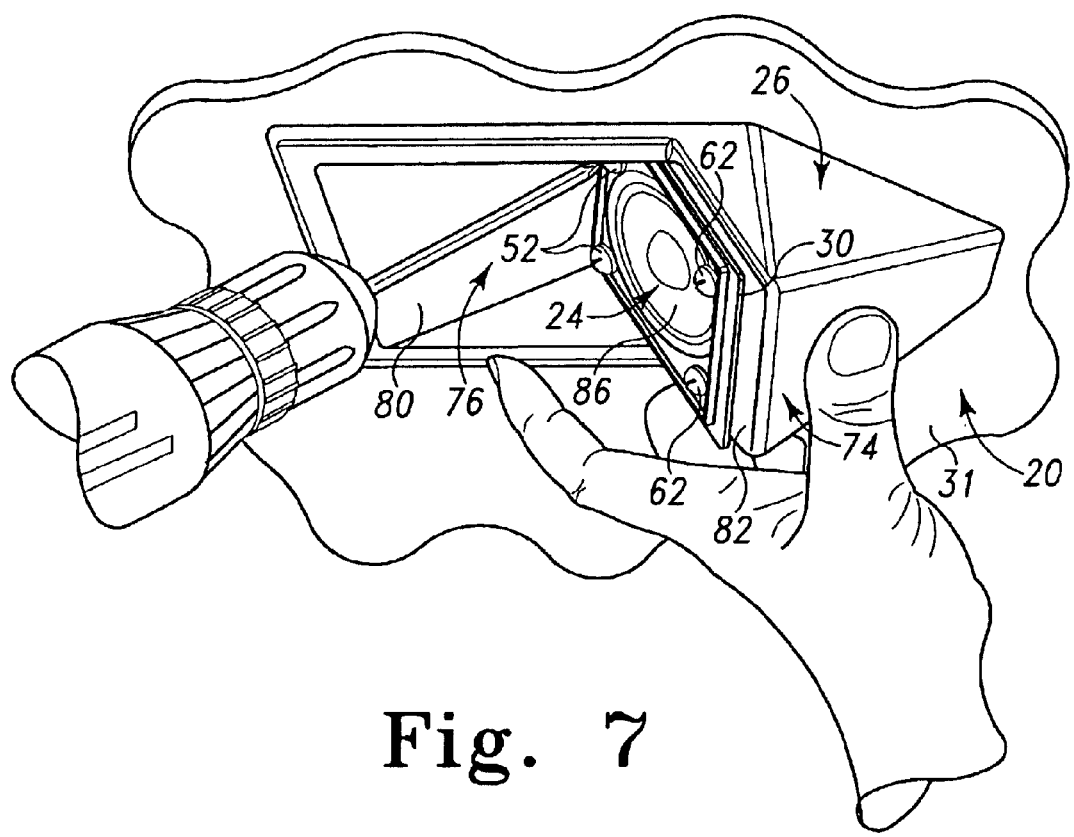
FIG. 7 is a perspective view showing the cover and a speaker of the speaker system being coupled to the mounting bracket (not shown in FIG. 7)

Assembly of the speaker system 18 is shown in FIGS. 4, 5, 7, and 8. The mounting bracket 22 is coupled to a lower surface 31 of the ceiling 20, as shown in FIGS. 4 and 5. A pair of mounting bracket fasteners 32 extend through apertures 33 formed in a first end wall 34 of the mounting bracket 22 to mount the first end wall 34 to the lower surface 31. Another pair of mounting bracket fasteners 32 extend through apertures 35 formed in a second end wall 36 of the mounting bracket 22 to mount the second end wall 36 to the lower surface 31. The end walls 34, 36 are generally parallel to the lower surface 31 when they are coupled to the lower surface 31, as shown in FIG. 7.

An upper portion of the mounting bracket 22 extends through a ceiling aperture 38 formed in the ceiling 20 when the end walls 34, 36 are coupled to the lower surface 31, as shown in FIGS. 5 and 7. A first intermediate wall 34 of the mounting bracket 22 is coupled to the first end wall 40 at a first lower bend 41 in the mounting bracket 22 and is inclined from the first end wall 34. A second intermediate wall 42 of the mounting bracket 22 is coupled to the second end wall 36 at a second lower bend 43 in the mounting bracket 22 and is inclined from the second end wall 36. The first and second intermediate walls 40, 42 are inclined from the first and second end walls 34, 36, respectively. As such, the first and second intermediate walls 40, 42 are also inclined relative to the lower surface 31. Each of the first and second intermediate walls 40, 42 extends upwardly through the ceiling aperture 38 and thus comprises a lower portion below the lower surface 31 and an upper portion above the lower surface 31. The first and second intermediate walls 40, 42 are coupled to one another at an upper bend 44 in the mounting bracket 22.

Figure 8:
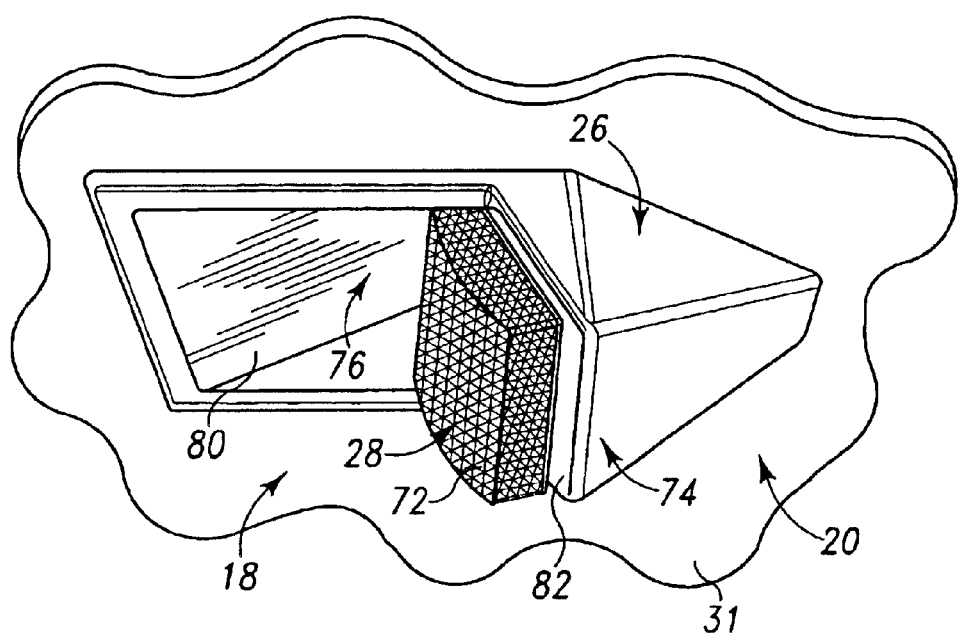
FIG. 8 is a perspective view showing the speaker system mounted to the ceiling.
Figure 9:
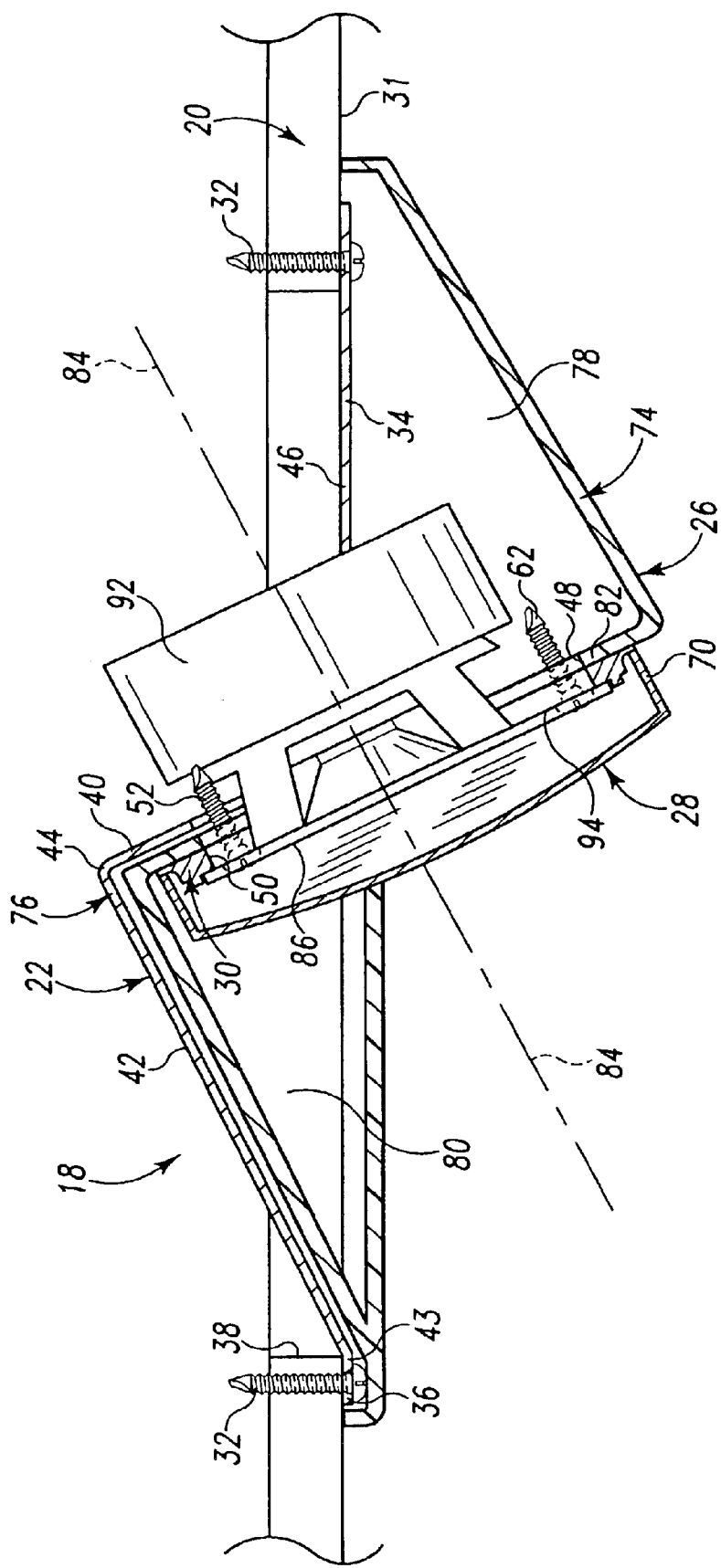
FIG. 9 is a sectional view of the speaker system mounted to the ceiling.

After the mounting bracket 22 is coupled to the ceiling 20, electrical conductors 51 shown routed through the ceiling 20 in FIGS. 4 and 5 are coupled to the speaker 24 and the speaker 24, the cover 26, and the protective member 28 are coupled to the mounting bracket 22, as shown in FIGS. 7–9. The speaker 24 is positioned to extend through first, second, and third speaker-receiving apertures 46, 48, 50. The first intermediate wall 40 and the first end wall 34 cooperate to provide the first speaker-receiving aperture 46 which is shown in FIGS. 3–5. The cover 26 is formed to include the second speaker-receiving aperture 48 which is shown in FIGS. 3 and 6. The support 30 is formed to include the third speaker-receiving aperture 50 which is shown in FIG. 3.

A pair of upper fasteners 52 (see FIGS. 3, 7, and 9) are coupled to the speaker 24, the support 30, the cover 26, and the mounting bracket 22. The upper fasteners 52 are positioned to extend through a pair of upper speaker apertures 54 (see FIG. 3) formed in a flange of the speaker 24, a pair of upper support apertures 56 (see FIG. 3) formed in the support 30, a pair of upper cover apertures 58 (see FIGS. 3 and 6) formed in the cover 26, and a pair of mounting bracket apertures 60 (see FIGS. 3–5) formed in the first intermediate wall 40 of the mounting bracket 22. In this way, the upper fasteners 52 couple the speaker 24, the support 30, and the cover 26 to the mounting bracket 22.

A pair of lower fasteners 62 (see FIGS. 3, 7, and 9) are coupled to the speaker 24, the support 30, and the cover 26. The lower fasteners 62 are positioned to extend through a pair of lower speaker apertures 64 (see FIG. 3) formed in the flange of the speaker 24, a pair of lower support apertures 66 (see FIG. 3) formed in the support 30, and a pair of lower cover apertures 68 (see FIGS. 3 and 6) formed in the cover 26. In this way, the lower fasteners 62 couple the speaker 24 and the support 30 to the cover 26.

Once the speaker 24, the support 30, and the cover 26 are mounted to the mounting bracket 22, the protective member 28 is mounted to the support 30 to complete assembly of the speaker system 18, as shown in FIGS. 8 and 9. The protective member 28 comprises, for example, a grill 70 (see FIG. 9) and fabric material 72 (see FIG. 8) stretched over the grill. The grill 70 may be made of a hard material to protect the internal components of the speaker.

When assembly of the speaker system 18 is completed, the cover 26 covers the mounting bracket 22, a portion of the speaker 24, and the ceiling aperture 38. A lower portion 74 of the cover 26 extends below the lower surface 31 and an upper portion 76 of the cover 26 extends above the lower surface 31. The lower portion 74 is formed to include a lower cavity 78 receiving a portion of the speaker 24. The upper portion 76 is formed to include an upper cavity 80 receiving another portion of the speaker 24.

The lower and upper portions 74, 76 of the cover 26 cooperate to provide a wall 82 that extends through the ceiling aperture 38, as shown in FIG. 9. The wall 82 is inclined relative to the lower surface 31 and is generally parallel to the first intermediate wall 40 of the mounting bracket 22. The wall 82 is formed to include the upper and lower cover apertures 58, 68 and the second speaker-receiving aperture 48.

The speaker 24 is coupled to the inclined walls 40, 82 of the mounting bracket 22 and the cover 26, respectively, as shown in FIG. 9. As such, a central axis 84 of the speaker 24 is oblique (i.e., nonparallel and nonperpendicular) relative to the lower surface 31 so that a sound output 86 of the speaker 24 faces in a desired direction to direct sound in that direction. In some embodiments, speaker 24 is oriented so that an included angle of forty-five degrees is formed between axis 84 and surface 31. With respect to the surround sound system 14 shown in FIG. 2, the sound outputs 86 of the speakers 24 of the central speaker system 18a and the left and right front speaker systems 18b, 18c face rearwardly and downwardly to direct sound generally rearwardly and downwardly and the sound outputs 86 of the speakers 24 of the left and right rear speakers systems 18d, 18e face forwardly and downwardly to direct sound generally forwardly and downwardly. "Rearwardly" means toward the rear 88 (see FIGS. 1 and 2) of the recreational vehicle 10 and "forwardly" means toward the front 90 (see FIGS. 1 and 2) of the recreational vehicle.

The speaker 24 extends through the ceiling aperture 38, as shown in FIG. 9. An upper portion 92 of the speaker 24 is positioned above the lower surface 31 and a lower portion 94 of the speaker 24 is positioned below the lower surface 31. By recessing the speaker 24 into the ceiling 20 in this manner, the speaker 24 becomes less of a visual and physical obstruction to people in the recreational vehicle 10 than if the speaker 24 were completely below the ceiling 20.

Although illustrative speakers systems 18 are mounted to ceiling 16, it is within the scope of this disclosure for speaker systems 18 to be mounted to portions of vehicle 10 other than ceiling 16. For example, speaker systems 18 may be mounted to side walls of vehicle 10 or to panels of one or more other structures, such as cabinets or decorative trim pieces, that are mounted to ceiling 18 and/or to the side walls of vehicle 10. In addition, speaker systems 18 mounted to counter tops, table tops, dash boards, or panels of booth-style seats are also contemplated by this disclosure.

Although the invention has been described in detail with reference to certain illustrative embodiments, variations and modifications exist with the scope and spirit of this disclosure as described and defined in the following claims.

What is claimed is:

1. An apparatus comprising
   a recreational vehicle comprising a ceiling having a lower surface and having an aperture,
   a mounting bracket coupled to the ceiling and comprising a first wall inclined relative to the lower surface, the first wall extending through the aperture so that a first portion of the first wall is above the lower surface and a second portion of the first wall is below the lower surface, and
   a speaker coupled to the first wall, the speaker extending through the aperture so that a first portion of the speaker is above the lower surface and a second portion of the speaker is below the lower surface.

2. The apparatus of claim 1, wherein the mounting bracket has an aperture through which the speaker extends.

3. The apparatus of claim 1, further comprising a cover covering the mounting bracket and at least a portion of the speaker.

4. An apparatus comprising
a recreational vehicle comprising a ceiling having a lower surface and having an aperture,
a mounting bracket coupled to the ceiling and comprising a first wall inclined relative to the lower surface, the first wall extending through the aperture so that a first portion of the first wall is above the lower surface and a second portion of the first wall is below the lower surface, and
a speaker coupled to the first wall, the speaker extending through the aperture so that a first portion of the speaker is above the lower surface and a second portion of the speaker is below the lower surface, wherein the mounting bracket comprises a second wall coupled to the lower surface, and the first wall is coupled to the second wall at a first bend in the mounting bracket and is inclined from the second wall.

5. The apparatus of claim 4, wherein the first wall and the second wall cooperate to provide an aperture through which the speaker extends.

6. The apparatus of claim 4, wherein the mounting bracket comprises a third wall and a fourth wall, the third wall is coupled to the first wall at a second bend in the mounting bracket and extends through the aperture, and the fourth wall is coupled to the lower surface and the third wall at a third bend in the mounting bracket.

7. An apparatus comprising
a recreational vehicle comprising a ceiling having a lower surface and having an aperture,
a mounting bracket coupled to the ceiling and comprising a first wall inclined relative to the lower surface, the first wall extending through the aperture so that a first portion of the first wall is above the lower surface and a second portion of the first wall is below the lower surface,
a speaker coupled to the first wall, the speaker extending through the aperture so that a first portion of the speaker is above the lower surface and a second portion of the speaker is below the lower surface, and
a cover covering the mounting bracket and at least a portion of the speaker, wherein the cover has an aperture through which the speaker extends.

8. The apparatus of claim 3, wherein the cover extends through the aperture so that an upper portion of the cover is above the lower surface and a lower portion of the cover is below the lower surface.

9. An apparatus comprising
a recreational vehicle comprising a ceiling having a lower surface and having an aperture,
a mounting bracket coupled to the ceiling and comprising a first wall inclined relative to the lower surface, the first wall extending through the aperture so that a first portion of the first wall is above the lower surface and a second portion of the first wall is below the lower surface,
a speaker coupled to the first wall, the speaker extending through the aperture so that a first portion of the speaker is above the lower surface and a second portion of the speaker is below the lower surface, and
a cover covering the mounting bracket and at least a portion of the speaker, wherein the cover extends through the aperture so that an upper portion of the cover is above the lower surface and a lower portion of the cover is below the lower surface, the upper and lower portions of the cover cooperate to provide a second wall inclined relative to the lower surface, the second wall extends through the aperture of the ceiling and has an aperture through which the speaker extends.

10. An apparatus comprising
a recreational vehicle comprising a ceiling,
a mounting bracket comprising a first wall coupled to a lower surface of the ceiling and a second wall coupled to the first wall and extending through an aperture formed in the ceiling such that the second wall is inclined relative to the lower surface, and
a speaker coupled to the second wall and extending through the aperture so that a first portion of the speaker is above the lower surface of the ceiling and a second portion of the speaker is below the lower surface of the ceiling, the speaker having a central axis that is inclined relative to the lower surface.

11. The apparatus of claim 10, wherein the mounting bracket has an aperture through which the speaker extends.

12. The apparatus of claim 10, wherein the first and second walls cooperate to provide an aperture through which the speaker extends.

13. The apparatus of claim 10, further comprising a cover that covers the mounting bracket and at least a portion of the speaker.

14. The apparatus of claim 10, wherein the first and second walls are coupled to one another at a first bend in the mounting bracket.

15. The apparatus of claim 10, wherein the mounting bracket is a one-piece mounting bracket.

16. An apparatus comprising
a recreational vehicle comprising a ceiling having an aperture,
a speaker supported relative to the ceiling so that a first portion of the speaker is above a lower surface of the ceiling and a second portion of the speaker is below the lower surface of the ceiling, the speaker having a central axis that is oblique relative to the lower surface,
a mounting bracket that is coupled to the ceiling and extends through the aperture, the speaker being coupled to the mounting bracket and extending through the aperture, and
a cover that covers the mounting bracket and at least a portion of the speaker, wherein the cover comprises a wall that is inclined relative to the lower surface and extends through the aperture, and the wall has an aperture through which the speaker extends.

17. An apparatus comprising
a recreational vehicle comprising a ceiling,
a video system positioned within the recreational vehicle, and
a surround sound system operatively associated with the video system, the surround sound system comprising a plurality of speakers, each speaker extending at least partially within the ceiling above a lower surface of the ceiling and having a central axis that is oblique relative to the lower surface.

18. The apparatus of claim 17, wherein the surround sound system comprises a central front speaker facing rearwardly, a left front speaker facing rearwardly, a right front speaker facing rearwardly, a left rear speaker facing forwardly, and a right rear speaker facing forwardly.

19. The apparatus of claim 17, wherein the ceiling has a plurality of apertures, the surround system comprises a plurality of mounting brackets, each mounting bracket is coupled to the ceiling and comprises a first wall coupled to the lower surface and a second wall that is coupled to the first wall, extends through a respective one of the apertures, and is inclined relative to the lower surface, each speaker is coupled to a respective one of the second walls and extends through a respective one of the apertures so that a first portion of the speaker is above the lower surface and a second portion of the speaker is below the lower surface.

20. The apparatus of claim 19, further comprising a plurality of covers, each cover covering a respective one of the mounting brackets and at least a portion of a respective one of the speakers.

21. The apparatus of claim 19, wherein the first and second walls of each mounting bracket are coupled to one another at a first bend in the mounting bracket.

22. The apparatus of claim 19, wherein the mounting bracket is a one-piece mounting bracket.

* * * * *